United States Patent [19]

Kozai et al.

[11] Patent Number: 4,460,255
[45] Date of Patent: Jul. 17, 1984

[54] INSTANT CAMERA

[75] Inventors: Katsuya Kozai; Yoshihiro Fujita, both of Tokyo; Tadayoshi Shibata; Hisashi Kikuchi, both of Kanagawa; Hiroshi Nakai; Hirokazu Ichii, both of Saitama, all of Japan

[73] Assignee: Fuji Photo Film Co., Ltd., Kanagawa, Japan

[21] Appl. No.: 392,192

[22] Filed: Jun. 25, 1982

[30] Foreign Application Priority Data

Jul. 3, 1981 [JP] Japan .................. 56-104889

[51] Int. Cl.³ .................................. G03B 17/50
[52] U.S. Cl. .......................... 354/86; 354/304
[58] Field of Search .................. 354/83–86, 354/304

[56] References Cited

U.S. PATENT DOCUMENTS 3,625,130 12/1971 Van Allen ............................ 354/304
3,775,127 11/1973 Nerwin ............................ 354/304 X
4,017,879 4/1977 Lermann et al. .................... 354/304

OTHER PUBLICATIONS

Simpson, C. J. "Mounting Structure . . . Camera" in *Research Disclosure*, Jan. 1980, No. 18919, p. 17.

*Primary Examiner*—John Gonzales
*Attorney, Agent, or Firm*—Sughrue, Mion, Zinn, Macpeak and Seas

[57] ABSTRACT

An instant camera in which a self-processing type film unit is passed between a pair of spreading rollers and ejected to the exterior of the camera while a container means containing a development processing solution in the film unit is torn by the nipping force of the rollers causing said processing solution to be spread over an image forming region in said film unit, characterized by the spreading rollers being formed such that the clearance therebetween is greater at the center section thereof and smaller near the roller ends which contact the edges of said image forming region.

10 Claims, 10 Drawing Figures

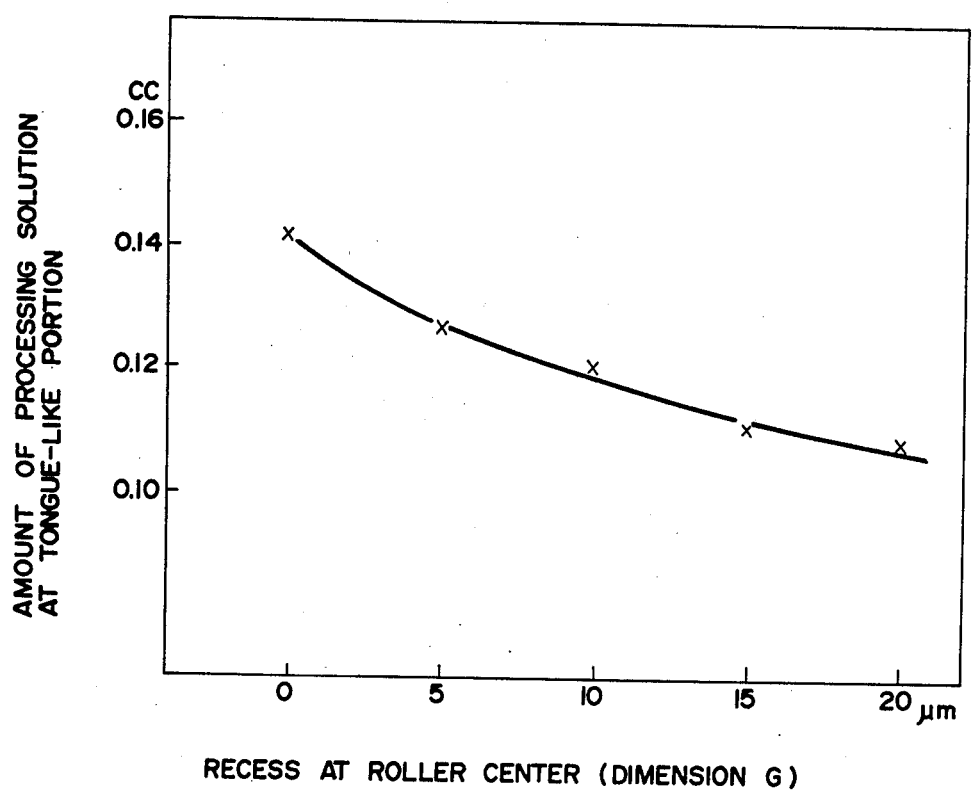

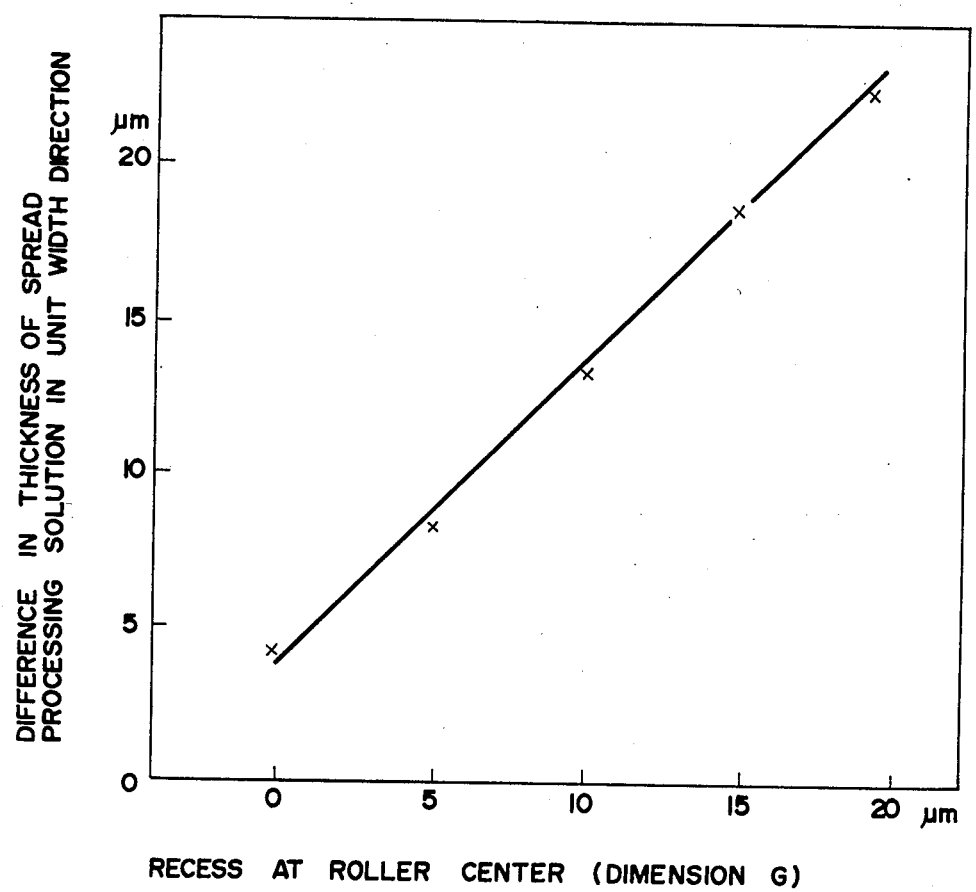

INSTANT CAMERA

BACKGROUND OF THE INVENTION

1. Field of the Invention

This invention relates to an improvement in an instant camera using a self-processing type film unit, and more particularly to an instant camera in which a development processing solution contained in the film unit can be spread and distributed through the image forming region of a film without causing an excess of the processing solution to be spread over the film unit during the development thereof.

2. Description of the Prior Art

Instant cameras using a self-processing type film unit (hereinafter simply referred to as the unit) have widely been used. An example of instant cameras is described for example in Japanese Unexamined Patent Publication No. 52(1977)-19224, and an example of units used in instant cameras is disclosed in Japanese Unexamined Patent Publication No. 50(1975)-153628. However, conventional instant cameras are not very satisfactory as will be described below with reference to FIGS. 1 to 4.

FIG. 1 is a plan view showing a unit used in an instant camera. As shown in FIG. 1, a unit 10 comprises a first flexible sheet 1 having an image receiving layer, and a second flexible sheet 3 serving as a supporting layer for assisting in uniformly spreading in a predetermined thickness a development processing solution (hereinafter simply referred to as the processing solution) over an image forming region 2. The first and second flexible sheets 1 and 3 are placed one upon the other and are secured with respect to each other by using a bonding member 4 which may comprise an intermediate sheet or an adhesive tape. The first and second sheets 1 and 3 are secured along the front ends thereof. A container means 5, contains the processing solution wherein subjecting the container means 5 to a predetermined external pressure causes the container means 5 to tear thereby releasing the processing solution therein and allowing the processing solution to be distributed in the space between the sheets 1 and 3. A trap means 6, is positioned along the rear end of the sheets 1 and 3 and acts as a trap means for absorbing any excess processing solution released from the container means 5.

Generally, an instant camera has a plurality of the units 10 (usually about ten units) which are stacked and loaded into a unit accommodating pack (hereinafter simply referred to as the pack). FIG. 2 shows an example of a pack used for this purpose. Referring to FIG. 2, the pack 20 is a relatively flat box-like vessel having; an exposure opening 22 perforated through an upper plate 21, and an elongated outlet 24 positioned above a front side plate 23 for allowing each unit 10 therein to pass therethrough. The pack 20 accommodates a plurality of units 10 stacked with their container means 5 facing the outlet 24. In the pack 20, a supporting means comprising a plate spring 25 always pushes the stack of units 10 up towards the exposure opening 22 and aligns the image forming region 2 of the uppermost unit with the exposure opening 22.

FIG. 3 is a partially cutaway plan view showing a conventional instant camera using the pack 20 as described above. Referring to FIG. 3, the pack 20 is loaded in a camera 30 so that the uppermost unit 10 may be exposed. A claw (not shown) in the camera 30 moves from the rear of the pack 20 to the exposure opening 22 through a notch 26 (FIG. 2) in the pack 20 (in the direction of the arrow A shown in FIG. 2). The leading edge of said claw contacts with the rear edge of the uppermost unit 10 and delivers the unit 10 through the outlet 24 of the pack 20 to the exterior thereof (in the direction of the arrow B shown in FIG. 2). When said claw is moved in said direction, the front end of the uppermost unit 10 (in the container means 5) reaches the nipping point between and along the adjacent surfaces of a pair of spreading rollers 27 and 28 of the camera 30. Moving said claw still further, causes the unit 10 to completely pass between spreading rollers 27 and 28 and out of the pack 20. The nipping force causes the spreading rollers 27 and 28 to respectively rotate clockwise and counterclockwise. Thus the unit 10 passes through the spreading rollers 27, 28 and through a unit ejection port 29 to the exterior of the camera 30. While the unit 10 passes between the spreading rollers 27 and 28, the container means 5 of the unit 10 is subjected to a pressure by the nipping force due to the spreading rollers 27 and 28 thereby causing the container means 5 to burst and allows the processing solution contained therein to escape therefrom. The spreading rollers 27 and 28 thereafter cause the released processing solution to spread evenly between the sheets 1 and 3.

Any excess processing solution is absorbed by the trap means 6. Consequently, the distributed processing solution initiates the development of the image forming region 2. Generally, in a conventional instant camera as described above, the spreading rollers used for tearing the container means and for spreading the processing solution are formed to have a uniform diameter over the entire length thereof. When the diameter of the spreading rollers is constant over their entire length, the spreading rollers cause the container means containing the processing solution to first burst at its central portion and then proceeds in the direction towards the side ends of the unit. While the tear propagates from the central portion to the side ends of the unit, the container means is compressed by the spreading rollers, and the processing solution is squeezed out of the container means. Accordingly, more processing solution is squeezed out of the container means at the central portion thereof, and the amount of the processing solution squeezed out decreases towards the side ends of the unit. As a result, the processing solution is spread a longer distance at the central portion of the unit and progressively shorter distances along the width thereof, thereby forming a tongue-like form as shown in FIG. 4. On the other hand, the processing solution must of course be spread throughout the whole image forming region of the unit. However, if too much processing solution is contained in the container means, a larger trap means is required for receiving the excess processing solution, and a larger amount of the processing solution is wasted. Therefore, it is desired to have just the necessary and sufficient amount of processing solution in the container means. However, when the processing solution is spread in the unit in the tongue-like form as shown in FIG. 4, the portion of the processing solution at the tip of the tongue-like spreading pattern (portion T in FIG. 4) is already trapped in the trap means before the processing solution is spread over the whole area of the image forming region in the unit. Therefore, even if the amount of the processing solution contained in the container means is selected appropriately, at least the portion of the processing solution corresponding to the tip of the tongue-like pattern is wasted when the processing solution is spread over the whole area of the image forming region.

SUMMARY OF THE INVENTION

The primary object of the present invention is to provide an improved instant camera in which the processing solution is most efficiently utilized.

Another object of the present invention is to provide an instant camera in which the container means need not contain a large excess of processing solution and the trap means for receiving the excess processing solution may be minimized in size.

The specific object of the present invention is to provide an instant camera in which a processing solution is spread in a substantially flat and uniform pattern along the width of the film unit instead of a tongue-like pattern.

The above object is accomplished by an instant camera in which development is conducted by passing the above-described film unit between a pair of spreading rollers, wherein the improvement comprises a pair of spreading rollers which are formed in such a manner that the clearance between said spreading rollers is larger at the central section thereof and decreases in the longitudinal direction of the rollers towards the roller ends which contact the side ends of the image forming region in said film unit.

If the clearance between a pair of the spreading rollers is such that it decreases from the central section of their length towards the roller ends, the tendency of the processing solution to be ejected from the container means predominantly at the center of the unit when the container means is torn due to the unit being pressed by the rollers is minimized and the processing solution is spread evenly through the unit. Therefore, it becomes possible to obtain a relatively flat and uniform spreading pattern of the processing solution. As a result, insofar as storing an appropriate amount of processing solution in the container means of a unit, it is possible to minimize the amount of processing solution going beyond the end of the image forming region and into the trap means when the processing solution is spread from the container means side to the trap means side and over the whole area of the image forming region of the unit. Namely, the amount of the processing solution consumed wastefully is minimized, thereby minimizing the amount of stored processing solution required.

Accordingly, with the instant camera in accordance with the present invention, the container means need not contain a large excess of the processing solution. As a result, the trap means for receiving the excess processing solution may be made smaller than presently required in conventional instant cameras.

The present invention will hereinbelow be described in further detail with reference made to the accompanying drawings, particularly FIGS. 5 to 10.

BRIEF DESCRIPTION OF THE DRAWINGS

FIG. 1 is a plan view of a self-processing type film unit,

FIG. 2 is a perspective view of a film unit accomodating pack,

FIG. 3 is a plan view of a conventional instant camera and

FIG. 4 is a plan view illustrating the spreading of solution across the film unit, FIGS. 6 and 7 are graphs showing the spreading configurations of the processing solution for the embodiment of the instant camera shown in FIG. 5.

DESCRIPTION OF THE PREFERRED EMBODIMENTS

Figure 5:
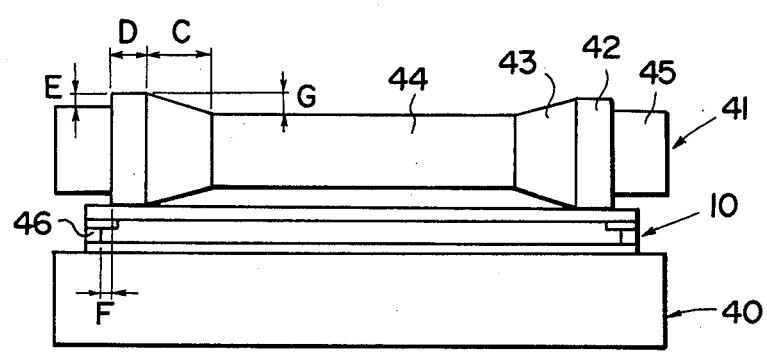
FIG. 5 is an elevational view showing part of an embodiment of the instant camera in accordance with the present invention.

FIG. 5 shows the spreading rollers employed in an embodiment of the instant camera in accordance with the present invention. Referring to FIG. 5, one spreading roller 40 takes the columnar form having the same diameter over the whole length thereof which is the same as the spreading rollers used in conventional instant cameras. The other spreading roller 41 has large diameter sections 42 at the positions contacting the vicinity of the side ends of the image forming region of the unit 10 as well as tapered sections 43 formed inside and adjacent to each large diameter section 42, and a small diameter section 44 formed at the center contiguous to the tapered sections 43. Therefore, the clearance between the spreading rollers 40 and 41 is larger at the center and smaller in the vicinity of the side ends of the image forming region of the unit 10. In FIG. 5, the unit 10 is shown enlarged in its thickness direction.

Figure 1:
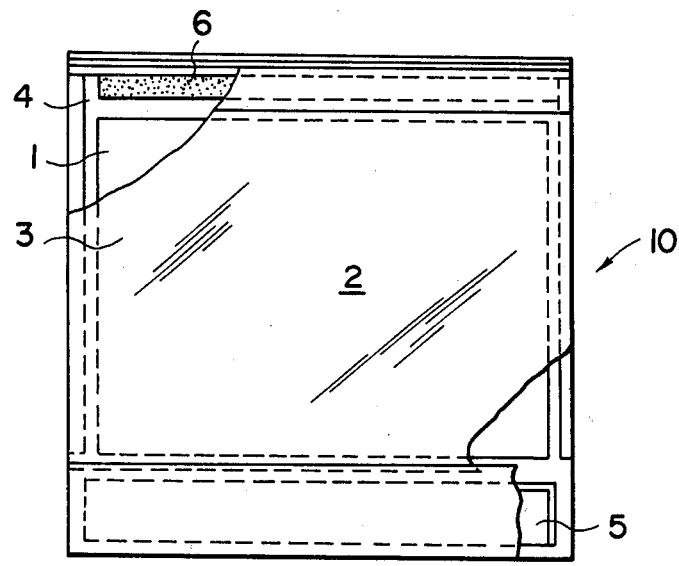
FIGS. 1–4 are views illustrating the prior art and in particular.
Figure 2:
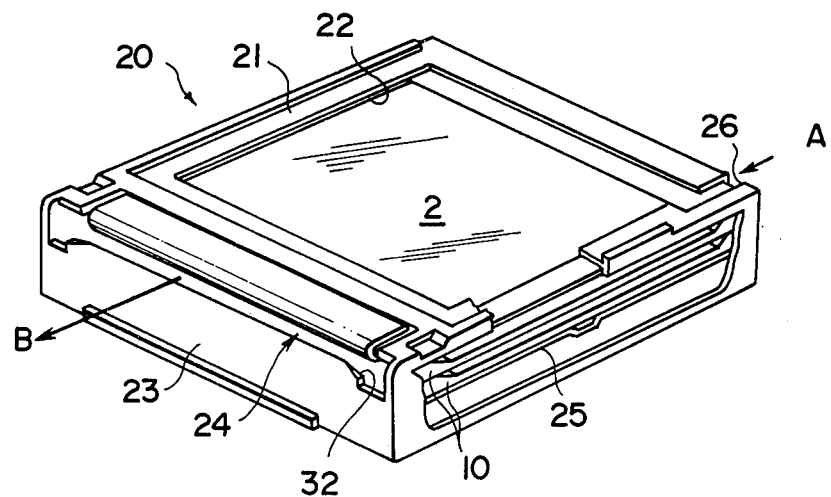
Figure 3:
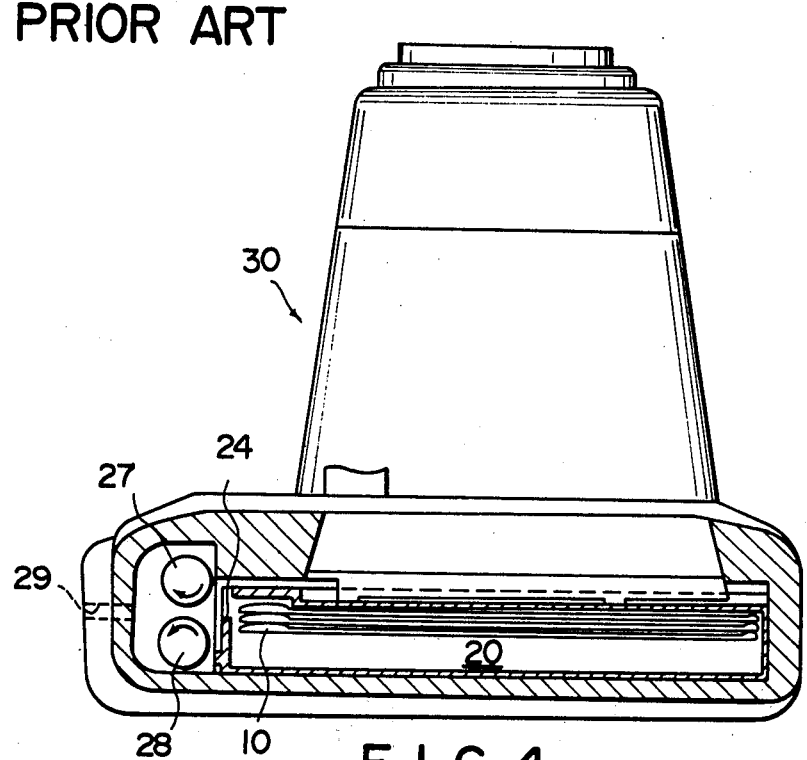
Figure 4:
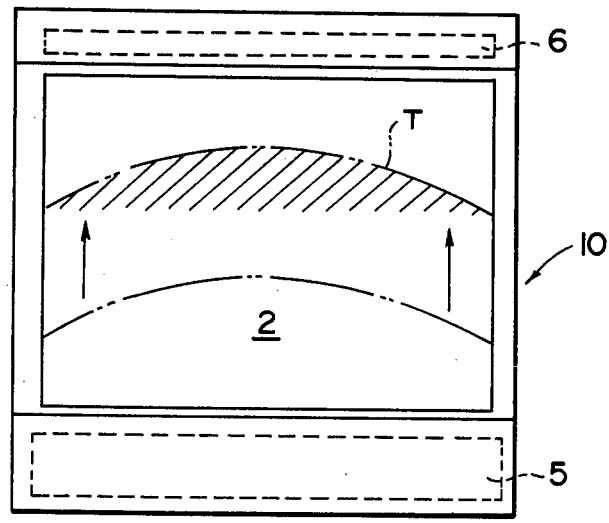

In experiments conducted by the inventors, several spreading rollers 41 having the shape as shown in FIG. 5 were made by setting the physical dimensions as follows: C=10 mm, D=7 mm, E=30 $\mu$m, F=1.5 mm, G=0 $\mu$m (columnar roller), 5 $\mu$m, 10 $\mu$m, 15 $\mu$m and 20 $\mu$m. Units (PR-10 available from Eastman Kodak) were passed between combinations of the spreading roller 40 and the above mentioned respective spreading rollers 41, and the occurrence of the tongue-like pattern (portion T in FIG. 4) was investigated. FIG. 6 shows the relationship between the above-described dimension G and the amount of processing solution constituting the tongue-like portion. As is clearly shown in FIG. 6, when the dimension G (i.e. the degree of recession at the center of the spreading roller 41) is increased, the tongue-like pattern diminishes. Namely, the protrusion at the leading portion of the spreading pattern becomes smaller, and the spreading pattern becomes flatter and more uniform.

On the other hand, when the degree of recession at the center of the spreading roller 41 is increased, the thickness of the processing solution spread at the center of the unit in its width direction increaaes, resulting in a larger difference between the thicknesses of the processing solution spread at the center and at the side ends of the unit. FIG. 7 shows the differences in the thicknesses of the processing solution spread in the width direction of the unit, for the cases where the processing solution was spread by using the above-mentioned five types of spreading rollers 41. As shown in FIG. 7, the larger the degree of recession at the center of the spreading roller 41, the larger the difference between the thicknesses of the spread processing solution in the width direction of the unit. The thickness difference was determined by measuring the thickness of the spread processing solution at several points taken at a fixed distance along the overall length in the longitudinal direction of the width of the image forming region of the unit. The mean values were evaluated using the measured values of the thickness of the spread processing solution at different positions in the width direction of the unit, with reference to the difference between the maximum and minimum thicknesses thus obtained. Because the difference in the thicknesses of the spread processing solution in the width direction of the unit results in an uneven image density, it is generally necessary that the difference be not more than 25 μm. Therefore, it is preferable that the degree of recession at the center of the spreading roller 41 (dimension G) be set to about 20 μm or less. It has been found that the unevenness of the image density becomes imperceptible if the length of the tapered section 43 of the spreading roller 41 (dimension C in FIG. 5) is set to a large value and the tapering angle of the tapered section 43 is reduced. Generally, the dimension C is preferably set to a value between 10 mm and 30 mm.

In FIG. 5, the spreading roller 41 has small diameter end sections 45 which are thinner than the large diameter sections 42 and positioned outside thereof. The small diameter end sections 45 are provided for the reason described below. The thickness of the spread processing solution in the unit is an important factor in forming a satisfactory image and should be maintained constant for all units from the view point of the photographic characteristics of the units. The thickness of the spread processing solution is determined by the thickness of spacers 46 in the unit 10 as shown in FIG. 5. However, when development is conducted by using a spreading roller having a small diameter section at the center of the roller, the thickness of the spread processing solution in the unit tends to increase. Namely, because the spreading roller has a recess at the center, the thickness of the processing solution spread by the central section of the spreading roller increases, resulting in a larger mean thickness of the spread processing solution in the whole unit. In this connection, when the end sections 45 of the spreading roller 41 opposite to the spacers 46 are formed to have a diameter smaller than that of the inner large diameter sections 42, the roller circumferences at the small diameter end sections 45 become farther from the spacers 46. Therefore, the spreading roller 41 can further approach the spreading roller 40 as if the thickness of the spacers 46 were reduced, and the mean thickness of the spread processing solution over the whole area of the unit can be decreased. In the embodiment shown in FIG. 5, the difference between the radii of the large diameter section 42 and the small diameter end section 45 (i.e. dimension E) is set to 30 μm. However, the dimension E may of course be varied appropriately to obtain a desired predetermined thickness of the spread processing solution. Alternatively, the thickness of the spread processing solution may be changed by another method, for example by changing the thickness of the spacers 46 instead of reducing the diameter of the end sections 45. It is also possible to set the diameter of the sections of the spreading roller 41 opposite to the spacers 46 to a value larger than that of the inner sections of the spreading roller 41 so as to increase the thickness of the spread processing solution. When forming the small or large diameter end sections on the spreading roller 41, it is of course necessary that the stepped portions adjoining the boundaries between these sections and the inner section be positioned so that the stepped portions are positioned inside of the inner edges of the spacers 46, but the dimension F on the unit 10 is preferably set in such a way that the stepped portions do not enter the image forming region.

If the length (dimension D) of the large diameter sections 42 is made too large, the thinner central section of the spreading roller 41 becomes too short and the effect of restricting the tongue-like spreading of the processing solution is reduced. Accordingly, the dimension D should not be too large, and is preferably about 10 mm or less.

Figure 8:
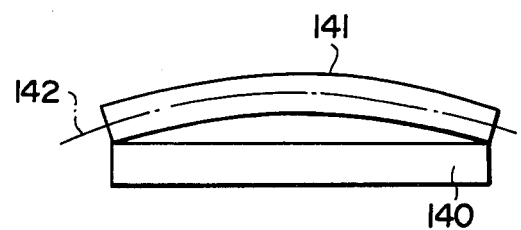
FIG. 8 is a schematic view showing spreading rollers used in another embodiment in accordance with the present invention.
Figure 9:
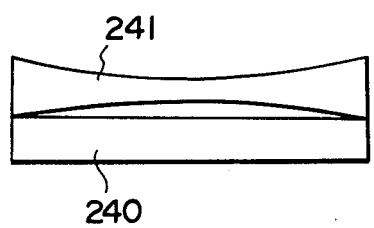
FIG. 9 is a schematic view showing spreading rollers used in a further embodiment in accordance with the present invention.
Figure 10:
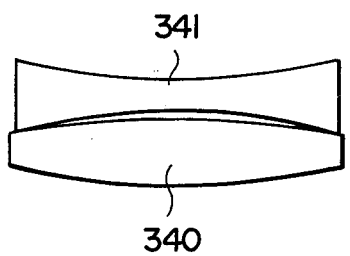
FIG. 10 is a schematic view showing spreading rollers used in a still further embodiment in accordance with the present invention.

In the embodiment shown in FIG. 5, the spreading roller 41 having a small diameter section at the center and large diameter sections at both ends is used in combination with the spreading roller 40 having the same diameter over the entire length thereof so as to obtain a large clearance at the center of the pair of the spreading rollers in the length direction thereof. However, other spreading rollers may also be used to obtain a central clearance larger than that in the vicinity of both ends of the spreading rollers. For example, as shown in FIG. 8, a columnar spreading roller 140 may be combined with a spreading roller 141 which has the same diameter over its entire length and can rotate around an arcuate rotating axis 142 by virtue of the elastic properties of the roller material. Alternatively, as shown in FIG. 9, a columnar spreading roller 240 may be combined with a spreading roller 241 whose diameter gradually increases from the center to both ends. In the embodiments shown in FIGS. 8, 9 and 5, it is not always necessary that one spreading roller is a columnar roller having the same diameter over its entire length. If necessary, the columnar spreading roller may be replaced by a spreading roller having a recess at the center. Further, as shown in FIG. 10, a spreading roller 340 having a thick central section may be combined with a spreading roller 341 having a central section recessed to a higher extent than the protrusion at the center of the spreading roller 340. Similarly for this case the clearance between the spreading rollers 340 and 341 is larger at the center and smaller in the vicinity of both ends.

We claim:

1. An instant camera in which a self-processing type film unit is passed between a pair of spreading rollers positioned in the same longitudinal direction so as to contact with each other, and then be ejected to the exterior of the camera while a container means in said film unit is torn by a nipping force due to said spreading rollers casuing a development processing solution contained in said container means to be spread and distributed in a predetermined image forming region, characterized in that said pair of spreading rollers are formed in such a manner that the clearance between said spreading rollers over said image forming region is larger in the vicinity of the central section of the image forming region, the central sections of said rollers in the longitudinal direction of the rollers being adjacent the central portion of the image forming region and smaller in the vicinity of the roller ends contacting the edges of the image forming region in said film unit.

2. An instant camera as defined in claim 1 wherein said clearance between said spreading rollers is about 20 μm or less at the central section thereof in the longitudinal direction of the rollers.

3. An instant camera as defined in claim 1 wherein one of said spreading rollers is a columnar roller having the same diameter over the entire length thereof, and the other of said spreading rollers has large diameter sections at both roller ends adjacent the edges of the image forming region in said film unit, tapered sections inside from said large diameter sections and a small diameter section at the center contiguous to said tapered sections.

4. An instant camera as defined in claim 3 wherein each of said large diameter sections has a length of about 10 mm or less.

5. An instant camera as defined in claim 3 wherein each of said tapered sections has a length between about 10 mm and 30 mm.

6. An instant camera as defined in claim 3 wherein the larger diameter sections of said other of said spreading rollers do not entend beyond the vicinity of the said image forming region, said other of said spreading rollers also having small diameter end sections outside from said large diameter sections and extending beyond the image forming region in said film unit.

7. An instant camera as defined in claim 1 wherein one of said spreading rollers is a columnar roller having the same diameter over the entire length thereof, and the other of said spreading rollers has the same diameter over the entire length thereof and can rotate around an arcuate rotating axis.

8. An instant camera as defined in claim 1 wherein one of said spreading rollers is a columnar roller having the same diameter over the entire length thereof, and the other of said spreading rollers has a diameter gradually increasing from the center to both ends.

9. An instant camera as defined in claim 1 wherein one of said spreading rollers has a thick central section, and the other of said spreading rollers has a central section recessed to a higher extent than that of the protrusion at said thick central section of said one of said spreading rollers.

10. An improved instant camera for taking self-developing pictures, the camera being of the type having:
 a compartment for storing a film pack containing a plurality of self-processing type film units contained therein each of said film units having a predetermined image forming region;
 means for individually ejecting each of the film units in said plurality of self-processing type film units from said film pack and said camera; and
 a pair of spreading rollers through which each of said ejected film units must pass therebetween whereby said rollers cause a container means containing a processing solution in said film unit to break and spread said processing solution over the image forming region in said film unit, the improvement wherein:
 said pair of spreading rollers are formed in such a manner that the clearance between said spreading rollers is larger in the vicinity of the central portion of the said image forming region, the central section of the spreading rollers in the longitudinal direction of the rollers being adjacent the central portion of said image forming region and smaller in the vicinity of the roller ends contacting the edges of the image forming region of the film unit.

* * * * *